United States Patent [19]
Schlicker et al.

[11] 3,868,521
[45] Feb. 25, 1975

[54] TACHOMETER GENERATOR
[75] Inventors: Volker Schlicker, St. Georgen;
Günter Wrobel, Villingen, both of Germany
[73] Assignee: Papst-Motoren KG, St. Georgen im Schwarzwald, Germany
[22] Filed: Sept. 25, 1972
[21] Appl. No.: 292,246

[30] Foreign Application Priority Data
Sept. 25, 1971 Germany.............................. 2147982

[52] U.S. Cl..................... 310/257, 310/43, 310/68
[51] Int. Cl. ............................................... H02k 1/12
[58] Field of Search .......... 310/267, 268, 43, 71, 68

[56] References Cited
UNITED STATES PATENTS
| | | | |
|---|---|---|---|
| 3,027,475 | 3/1962 | Gaudry | 310/43 |
| 3,181,020 | 4/1965 | Welter | 310/268 X |
| 3,219,862 | 11/1965 | Kieffert | 310/257 X |
| 3,383,534 | 5/1968 | Ebbs | 310/257 |

*Primary Examiner*—Donovan F. Duggan
*Attorney, Agent, or Firm*—Michael S. Striker

[57] ABSTRACT

A claw pole tachometer generator which can control the electric motor of a fan has a rotor and a stator. The stator winding is received in the circumferential groove of a thin-walled synthetic plastic frame which is located between the alternating claw poles of two mirror symmetrical ring-shaped sections consisting of ferromagnetic sheet material. The claw poles of the two sections are angularly offset relative to each other so that they are separated from each other by clearances of predetermined width. The two sections are riveted to each other, and the central portion of one section has a circular cutout communicating with a radially extending notch providing a passage for introduction of conductors which are connected to the fan motor. Additional conductors extend through apertures provided in a bracket which is bent out of the general plane of the central portion of the other section, and such additional conductors are soldered to contacts on the frame for the stator winding. The contacts are further soldered to the terminal means of the winding.

12 Claims, 19 Drawing Figures

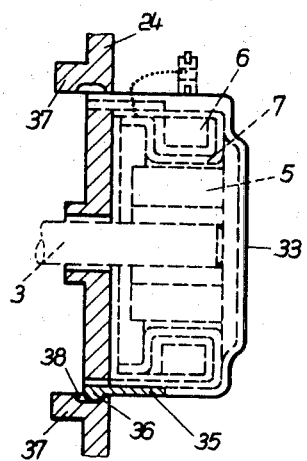
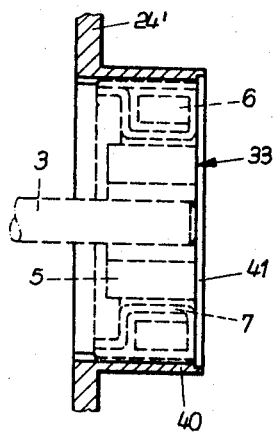
Fig. 1　　　　Fig. 2
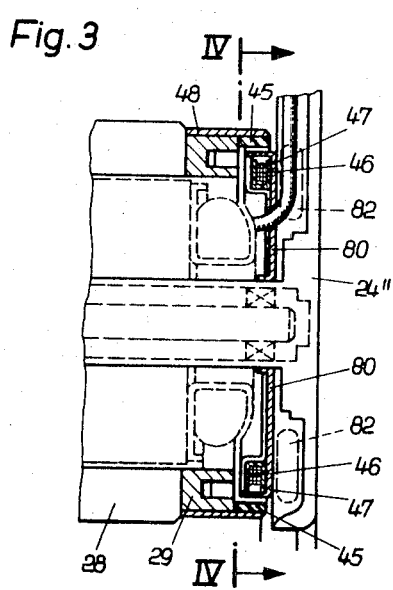
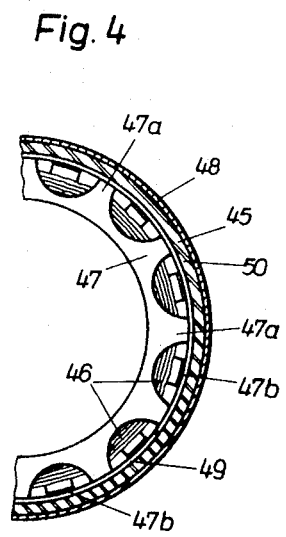
Fig. 3　　　　Fig. 4

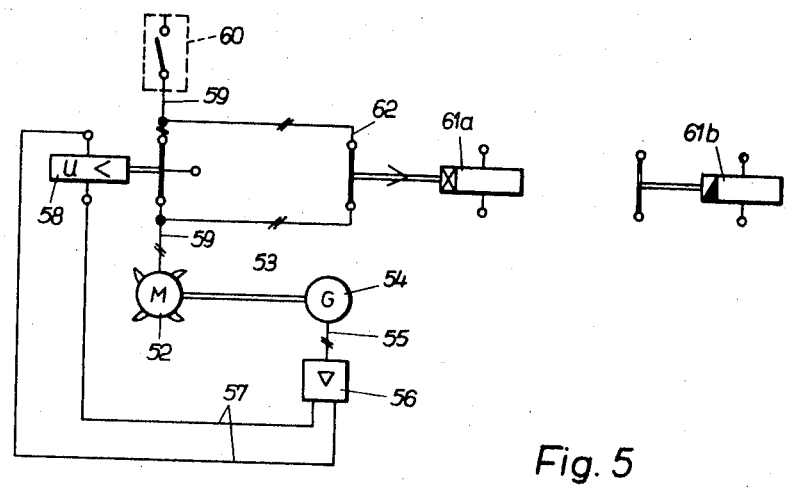
Fig. 5
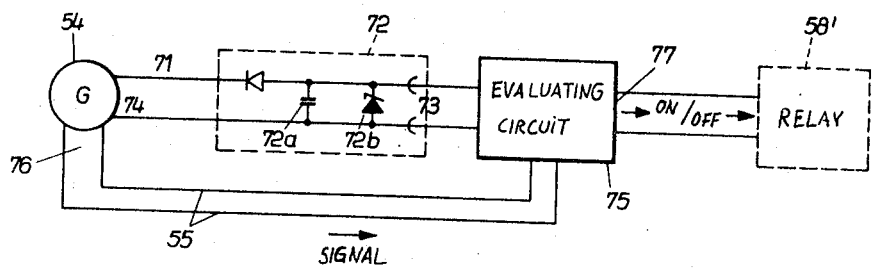
Fig. 6
Fig. 8
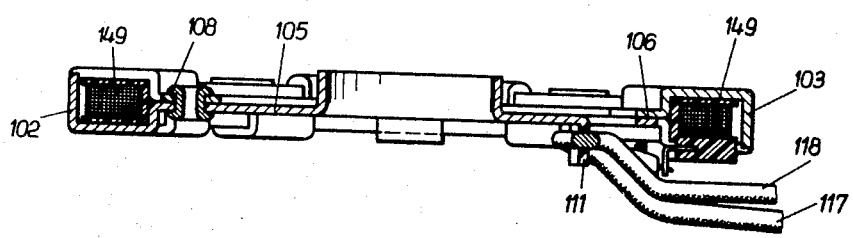

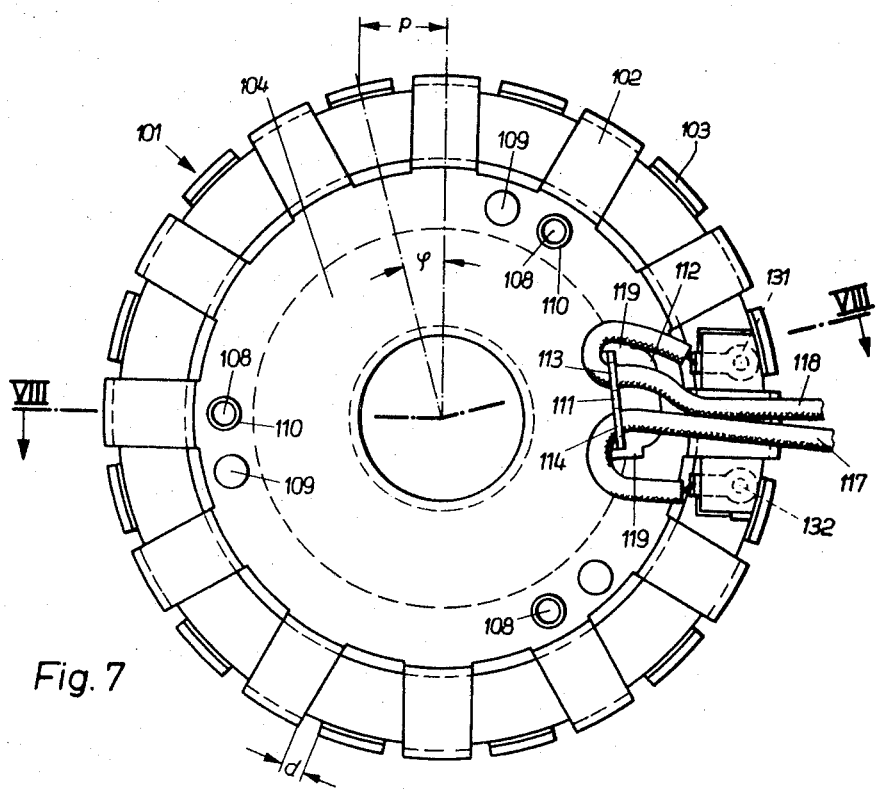
Fig. 7
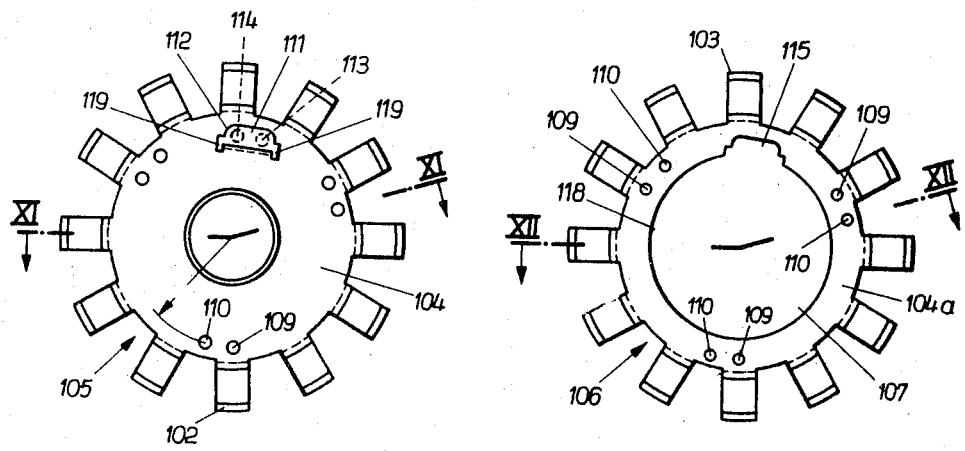
Fig. 9
Fig. 10

TACHOMETER GENERATOR

CROSS-REFERENCE TO RELATED APPLICATION

The method and the tachometer generator of the present invention constitute improvements over the method and tachometer generators disclosed in the commonly owned copending application Ser. No. 74,604 filed Sept. 23, 1970 by Georg F. Papst et al.

BACKGROUND OF THE INVENTION

The present invention relates to tachometer generators in general, and more particularly to improvements in claw pole tachometer generators of the type disclosed in the aforementioned copending application of Georg F. Papst et al. Still more particularly, the invention relates to improvements in the stators of claw pole tachometer generators and in a method of assembling the component parts of such stators.

The copending application Ser. No. 74,604 discloses an electric fan motor and a tachometer generator which automatically controls the motor by opening the motor circuit when the RPM of the motor is without a predetermined range. The tachometer generator produces an auxiliary voltage which varies as a function of changes in the RPM of the motor, and such voltage can be used to control a relay which is installed between the motor and a source of electrical energy. The tachometer generator may be mounted in or on the housing of the motor so that it need not be provided with a discrete housing.

Tachometer generators are used for a variety of purposes, for example, as a means to monitor the rotational speed of a motor or the like and/or as a means for controlling the speed of rotary devices by generating signals which can be used to change the rotational speed when the speed decreases below or rises above a preselected value. As a rule, a tachometer generator comprises a stator and a rotor which is rotated by a motor or another rotary device and defines with the stator an air gap. A drawback of such tachometer generators is that they produce a relatively weak output signal so that the system embodying or combined with a tachometer generator must further employ complex and expensive electronic amplifying equipment.

SUMMARY OF THE INVENTION

An object of the invention is to provide a novel and improved tachometer generator which can be mass-produced at a low cost.

Another object of the invention is to provide a novel and improved stator for a tachometer generator.

A further object of the invention is to provide a novel and improved method of assembling the stator of a tachometer generator, particularly a claw pole tachometer generator.

An additional object of the invention is to provide a novel and improved method of assembling the claw pole unit of the stator in a claw pole tachometer generator.

Still another object of the invention is to provide a novel method of assembling the winding, the frame for the winding and the claw pole unit of the stator in a tachometer generator.

The method of the present invention is utilized for assembling a claw pole tachometer generator which can control the motor of an electric fan and includes a motor-driven rotor and a stator having a claw pole unit whose claw poles define a ring-shaped cage for the frame of the stator winding. The method comprises the steps of stamping from a ferromagnetic sheet material two at least substantially identical claw pole unit sections each having a disk-shaped central portion and an annulus of claw poles extending radially outwardly from the respective disk-shaped portion, orienting the two sections to occupy positions of mirror symmetry with reference to a plane which is located between the two disk-shaped portions so that the claw poles of one of the annuli alternate with the claw poles of the other annulus, and riveting or otherwise fastening the thus oriented sections to each other.

One of the disk-shaped portions is preferably provided with a centrally located cutout prior to the orienting step. The method may further comprise the additional steps of providing one of the disk-shaped portions with a substantially semicircular or U-shaped slit and bending the material which is surrounded by the slit from the general plane of the one disk-shaped portion to form a bracket which is integral with the one disk-shaped portion. The width of the slit is preferably increased at both ends to facilitate the bending of the material of the one disk-shaped portion during the formation of the bracket.

The other disk-shaped portion can be provided with a similar slit and with the aforementioned concentric cut-out which latter is bounded by a surface intersecting one of the surfaces flanking the slit in the other disk-shaped portion. Thus, when the material which is surrounded by the two intersecting surfaces is removed, the other disk-shaped portion exhibits a centrally located cutout and a radially outwardly extending notch which communicates with the cutout and can be utilized to form a passage for threading of conductors which are connected to the motor.

The frame of the stator winding can be connected with two current-conducting contacts in the form of elastic tongues or eyes, and such contacts are thereupon bent to facilitate convolution of the leading end of wire which is to form the winding around one of the contacts. The leading end is thereupon threaded through a first slot which is adjacent to the one contact and is provided in the frame, and the wire is then convoluted around the frame to form the winding. In a further step, the leading end of the wire is caused to pass through a second slot provided in the frame adjacent to the other contact and is convoluted around the other contact. The just described steps precede the orienting step.

The two contacts are further connected with discrete conductors and are soldered to the conductors and to winding.

The winding preferably consists of lacquer-coated wire which can be baked prior to but preferably after insertion into the cage which is formed by the claw poles of the stator. This renders it possible to use a thin-walled frame which may consist of a cheap synthetic plastic material. The heating is preferably effected by electric current impulses.

The novel features which are considered as characteristic of the invention are set forth in particular in the appended claims. The improved tachometer generator itself, however, both as to its construction and its mode of operations, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a conventional fan motor and of a tachometer generator which is attached to the motor housing and can be constructed and assembled in accordance with the present invention;

FIG. 2 is a fragmentary sectional view of another conventional motor housing which has an outwardly extending cylindrical portion for reception of the tachometer generator;

FIG. 3 is a fragmentary sectional view of a further motor and certain parts of a modified tachometer generator having a rotor and a conventional stator;

FIG. 4 is a sectional view as seen in the direction of arrows from the line IV—IV or FIG. 3;

FIG. 5 is a diagram of a known control system for a fan motor wherein the control system includes a tachometer generator;

FIG. 6 is a diagram of a different control system;

FIG. 7 is an enlarged plan view of the stator in a tachometer generator which embodies the invention;

FIG. 8 is a sectional view as seen in the direction of arrows from the line VIII—VIII of FIG. 7;

FIG. 9 is a true-to-size plan view of one claw pole unit section forming part of the stator shown in FIG. 7;

FIG. 10 is a true-to-size plan view of the other claw pole unit section of the stator shown in FIG. 7;

DESCRIPTION OF THE PREFERRED EMBODIMENTS

Figure 11:
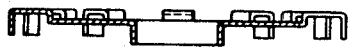
FIG. 11 is a section as seen in the direction of arrows from the line X—X of FIG. 9.

Referring first to FIG. 1, there is shown a tachometer generator 33 which is secured to a housing portion or flange 24 of an electric motor having a shaft 3. The tachometer generator 33 includes a magnetic pole rotor wheel 5 driven by the shaft 3, a stationary winding 6 and stationary claw poles 7 forming a receptacle or cage for the winding 6. The casing of the generator 33 has elastic prongs 35 provided at their free ends with projections 36 which can snap into sockets 38 provided therefor in a centering ring 37 of the flange 24. The ring 37 extends inwardly of the motor housing so that the flange 24 need not exhibit any outwardly protruding parts.

FIG. 2 shows that the flange 24' of the motor housing comprises an outwardly extending cylindrical portion 40 which can be formed thereon by casting and serves to receive and completely surround the tachometer generator 33. The motor shaft is shown at 3, the magnetizable rotor wheel of the tachometer generator 33 at 5, the stationary winding at 6 and the stationary claw poles at 7. The open end of the cylindrical portion 40 is closed by a simple flat cover 41. The depth or axial length of the cylindrical portion 40 depends on the corresponding dimension of the tachometer generator 33.

Referring to FIGS. 3 and 4, there is shown in axial section a portion of an outer rotor 28, 29 of an electric fan motor and a claw pole tachometer generator including a multi-pole magnetized rotor ring 45, a stationary winding 46 and a stationary claw pole unit 47, both surrounded by that rotor ring 45. An annular rotary member 48 of ferromagnetic material extends beyond the end portion 29 of the rotor housing so as to allow for inserting of the ring 45. At the same time, the annulus 48 serves as a magnetic return circuit member of the claw pole unit 47, that is, of annuli of claw poles 47a and 47b.

The claw pole unit 47 (see particularly FIG. 4) has two annuli of claw poles 47a, 47b which are located at the opposite sides of the ring-shaped winding 46. The claw poles 47a, 47b define with the rotary annulus 48 an air gap 49. In the illustrated embodiment, the ring 45 is a flexible permanent magnet strip exhibiting the elasticity of rubber and placed onto a wedge 50 within the annulus 48. This is known under the trade name "Sprox." The flexible permanent magnet strip is magnetized beforehand with a high current discharge (current strength of about $10^4$ Amperes, duration about one-tenth of a second) over a rigid meandering conductor having conductor portions distributed in the same way as the claw poles 47a, 47b. The claw pole unit 47 is secured to the flange 24" of the motor housing.

The air gap 49 is much wider than usual, i.e., instead of having a width in the range of one or more tenths of a millimeter, the width of this air gap approximates or exceeds 1 millimeter.

The parts 45, 48 constitute the rotor and the parts 46, 47 constitute the stator of the tachometer generator.

FIG. 5 illustrates one embodiment of a complete fan arrangement having automatic control capability. The electric motor 52 drives a fan, not shown, and the magnetizable rotor wheel (not shown) of a tachometer generator 54 corresponding to the generator 33 of FIGS. 1–2 or the generator of FIGS. 3–4. The mechanical torque transmitting connection between the motor 52 and the rotor of the tachometer generator 54 is shown at 53. When the RPM of the motor 52 decreases, the tachometer generator 54 furnishes a lower induced voltage by way of a two-phase lead 55, an amplifier 56, the output 57 of amplifier 56, and on to a low-tension switch 58. When the output voltage of the tachometer generator 54 drops to a predetermined value, the switch 58 opens the two- or three-phase lead 59 which connects the motor 52 with a source of electrical energy.

The switch 58 should not interrupt the connection between the energy source and the motor 52 when the latter is being started, i.e., when the tachometer generator 54 does not supply any voltage. To this end, the closing of a starter switch 60 for the motor 52 energizes a time-delay relay 61 which opens a bypass connection 62 between the switch 60 and the motor 52 only after the switch 60 has remained closed for a predetermined interval of time during which the motor 52 drives the tachometer generator 54 so that the latter can furnish a voltage signal. The reference character 61b denotes a thermal relay which can be used as a substitute for the time-delay relay 61a.

Referring to FIG. 6, there is shown a portion of a modified fan arrangement. A first output 74 of the tachometer generator 54 is connected with a first input of an evaluating circuit 75 by way of a two-phase lead 71. The lead 71 contains a rectifier unit 72 which can comprise a capacitor 72a and a Zener diode 72b. The output 73 of the rectifier unit 72 furnishes to the corresponding input of the evaluating circuit 75 a constant d-c voltage signal (e.g., 10 volts) when the RPM of the motor which drives the fan (not shown) and the tachometer generator 54 remains within a predetermined range.

A second output 76 of the tachometer generator 54 furnishes a second signal whose frequency or voltage is a function of the RPM of the motor. For example, when the motor drives its output shaft at a predetermined RPM, the output 76 will furnish a signal having a frequency of 400 Hz and a voltage of 10 Veff. The second output 76 of the tachometer generator 54 is connected with a second input of the evaluating circuit 75 by a lead 55. The outputs 74 and 76 can be connected in parallel. The output 77 of the evaluating circuit 75 furnishes a signal to start or arrest the motor (not shown) by way of a relay 58'; such signal is produced as a function of the characteristic of the signal issuing from the output 76 of the tachometer generator 54.

The rectifier unit 72 and/or the evaluating circuit 75 of FIG. 6 can be mounted in the interior of the fan motor or in the interior of the tachometer generator. For example, and as shown in FIG. 3, the tachometer generator may include a plate-like carrier 80 for the claw pole unit 47; this carrier 80 can serve as a support for the rectifier unit 72 and/or evaluating circuit 75. Alternatively, the unit 72 and/or the circuit 75 can be installed in a space 82 (FIG. 3) provided between the flange 24'' and the claw pole unit 47.

Figure 12:
FIG. 12 is a section as seen in the direction of arrows from the line XII—XII of FIG. 10.
Figure 14:
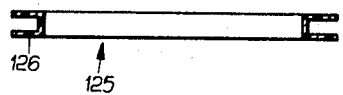
FIG. 14 is an axial sectional view as seen in the direction of arrows from the line XIV—XIV of FIG. 13.
Figure 16:
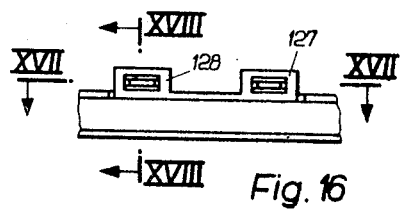
FIG. 16 is an enlarged fragmentary end elevational view of the frame as seen in the direction of arrow XVI of FIG. 13.
Figures 13, 15:
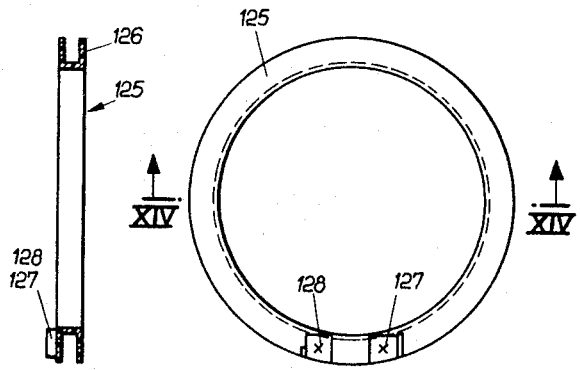
FIG. 13 is a plan view of the frame for the winding in the stator of FIG. 7.
FIG. 15 is an axial sectional view of the frame taken in a plane making a right angle with the plane of section shown in FIG. 14.
Figure 18:
FIG. 18 is a sectional view as seen in the direction of arrows from the line XVIII—XVIII of FIG. 16.
Figure 17:
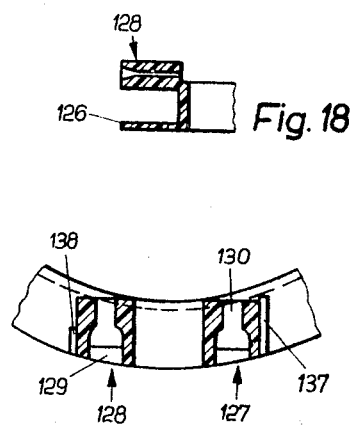
FIG. 17 is a sectional view as seen in the direction of arrows from the line XVII—XVII of FIG. 16.

FIG. 7 is an enlarged plan view of the stator of a claw pole tachometer generator 101 which constitutes a modification of the tachometer generator shown in FIGS. 3 and 4. The stator of the tachometer generator 101 of FIG. 7 comprises two sets of claw poles 102, 103 each of which is a strip-shaped member having a substantially constant width and respectively extending radially from a disk-shaped portion 104, 104a (see also FIGS. 8-12). The claw poles 102 alternate with the claw poles 103 and are separated from each other by clearances d, as considered in the circumferential direction of the tachometer generator. The portion 104 and its claw poles 102 together constitute a first section 105 of the claw pole unit; a second section 106 of this claw pole unit includes the portion 104a and the claw poles 103. The manner in which the claw poles 102, 103 are bent to form a receptacle or cage for the winding 149 (see FIGS. 8 and 19) of the stator of the tachometer generator 101 is best shown in FIGS. 11 and 12.

The sections 105, 106 consist of ferromagnetic material. The angle $\phi$ indicates in FIG. 7 the extent to which the neighboring claw poles 102, 103 are offset relative to each other, as considered in the circumferential direction of the tachometer generator. The distance between the centers of the outermost portions of neighboring claw poles 102, 103 is shown at p. This distance corresponds to half the distance between the centers of two neighboring claw poles 102 or 103. The sections 105, 106 are substantially mirror symmetrical to each other relative to a plane which is parallel to and located between the disk-shaped portions 104, 104a.

In making the sections 105, 106, the parts 104, 102 and 107, 103 can be stamped from sheet metal by resorting to a main tool whereby or whereupon the sections are suitably deformed. In a subsequent operation, the section 106 is subjected to a secondary treatment to provide its disk-shaped portion 104a with a large concentric opening or cutout 107 and a radially outwardly extending notch 115. This can be achieved by resorting to a simple and inexpensive material removing tool. Thus, the configuration of the mirror symmetrical sections 105, 106 is practically identical save for the fact that the disk-shaped portion 104a of the section 106 exhibits a concentric cutout 107 and a notch 115. Once the sections 105, 106 are oriented in a manner as shown in FIG. 7, they can be connected to each other by rivets 108 or analogous fasteners.

As shown in FIGS. 7, 9 and 10, each of the portions 104, 104a can be provided with three equidistant pairs of holes 109, 110 which are closely adjacent to the inner ends of the respective claw poles 102, 103 and whose centers are located on circles having identical radii R. The distance between the centers of two neighboring holes 109, 110 equals the angle $\phi$. Consequently each hole 109 of the portion 104 registers with a hole 110 of the portion 104a, or vice versa, when the sections 105, 106 are oriented in a manner as shown in FIG. 7.

The section 105 is formed with an integral bracket or lug 111 which is preferably adjacent to the circle, having the radius R and can serve as a support or guide for conductor means 117, 118 connected to the winding 149. As shown in FIG. 7, the bracket 111 is provided on the disk-shaped portion 104 diametrically opposite a pair of holes 109, 110, i.e., substantially midway between the other two pairs of holes 109, 110. This bracket is obtained by forming in the portion 104 a substantially U-shaped or semicircular slit 112 and by providing the part within the slit 112 with two apertures 113, 114 for the conductor means 117, 118. The part within the slit 112 is thereupon bent outwardly from the general plane of the portion 104 to form the bracket 111 which preferably makes an angle of 90° with the plane of the portion 104. It is preferred to widen the two ends of the slit 112, as at 119, so as to allow for convenient bending of the bracket 111 from the general plane of the portion 104. In other words, the major part of the slit 112 has a minimal width and the two portions 119 of greater width are located only at the ends of the slit. This is desirable because the treatment of the section 105 preferably parallels the treatment of section 106, i.e., the slit 112 is formed in each of the portions 104 and 104a, even though the section 106 need not be provided with a bracket. As shown in FIG. 10, the notch 115 of the portion 104a is located radially outwardly of the slit 112 in the portion 104a; consequently, were the entire slit 112 as wide as the enlarged portions 119, too much material would be removed from the portion 104a in the critical region of the notch 115. This would unnecessarily reduce the stability of the section 106 and would affect the magnetic circuit for the adjacent claw poles 103. It was found that a mere slitting of material of the portion 104a in the region of the notch 115 does not unduly reduce the rigidity of the section 106 nor does it adversely affect the magnetic flux in such region. This holds true even if the section 106 is also provided with the relatively wide portions 119 which is desirable in order to insure that the sections 105, 106 can be formed by one and the same main stamping tool.

When the section 106 is thereupon subjected to a secondary treatment to form the cutout 107, the surface 118 (see FIG. 10) surrounding the cutout 107 intersects one of the surfaces bounding the slit 112 which results in formation of the aforementioned notch 115. FIG. 10 further shows that the notch 115 is located diametrically opposite a pair of holes 109, 110 in the portion 104a. Consequently, when the sections 105, 106 are assembled in a manner as shown in FIGS. 7 and 19, the notch 115 registers with the bracket 111 and provides a passage 145 for convenient introduction of conductor means 146, 147 (FIG. 19) for the electric motor whose speed is monitored by the tachometer generator 101.

Figure 19:
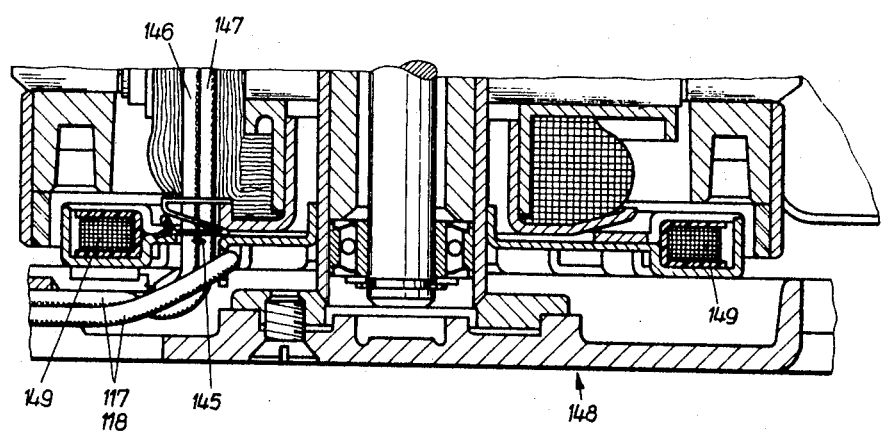
FIG. 19 is a fragmentary axial sectional view of an assembled tachometer generator which embodies the structure shown in FIGS. 7–18 and a rotor similar to that shown in FIG. 3.

In order to reduce the likelihood of excessive pull on the conductor means 117, 118, the conductor means are threaded through the respective apertures 113, 114 of the bracket 111 and are thereupon bent through at least 90° in a manner as shown in FIGS. 7, 8 and 19.

An important advantage of the tachometer generator 101 is that the sections 105, 106 of its claw pole unit can be shaped by a single main stamping tool whereby the section 106 requires a relatively minor secondary treatment to form the cutout 107 and the notch 115, and the section 105 requires a relatively minor secondary treatment to change the position of the bracket 111 by bending it out of the general plane of the respective disk-shaped portion 104. As mentioned before, the distribution of holes 109, 110 in the portions 104, 104a is such that, when the sections 105, 106 are properly assembled so that the neighboring claw poles 102, 103 are separated from each other by clearances d, each hole 109 of the portion 104 registers with a hole 110 of the portion 104a, or vice versa. This explains the need for pairs of holes 109, 110 in each of the sections 105, 106.

It will be noted that each of the claws 102, 103 has a substantially rectangular outline, as considered in the axial direction of the section 105 or 106. This is in contrast to the claw poles 47a, 47b shown in FIG. 4 each of which is much wider at the root than at the outermost end thereof. Such claw poles must be produced by deep drawing which is more complex and more expensive than the simple stamping operation necessary for the making of claw pole unit sections 105, 106 shown in FIGS. 7–12.

FIGS. 13 to 18 illustrate the frame or support 125 for the winding 149 between the claw poles 102, 103 of the stator of the tachometer generator 101 shown in FIGS. 7–12 and 19. The frame 125 resembles a reel or spool (see particularly FIGS. 13–15) and preferably consists of a suitable synthetic plastic material (such as polyamide) having a substantially U-shaped cross section. The thickness of the walls 126 of the frame 125 is about 0.5 millimeter. This frame can be mass-produced by injection molding and is provided with integral pockets 127, 128 each defining a channel having a wider portion 129 and a narrower portion 130. The pockets 127, 128 receive brass contacts or soldering eyes 131, 132 (see FIG. 7) having portions whose configuration is complementary to that of the surfaces bounding the channels in the respective pockets 127, 128. Once they are properly inserted into the respective pockets 127, 128, the exposed portions of the contacts 131, 132 are bent through an angle of 90°. Such insertion and bending take place prior to convoluting the winding 149 onto the frame 125. The leading end of the wire which is to form the winding 149 is repeatedly convoluted around the contact 131 and is thereupon threaded through a relatively long slot 137 into the circumferential groove of the frame 125 which groove receives the winding 149. Upon completion of the winding operation, the leading end is threaded through a relatively short slot 138 of the frame 125 and is caused to form several convolutions around the contact 132.

The frame 125, with the winding 149 thereon, is then placed between the sections 105, 106 of the claw pole unit. In the next step, the conductor means 117, 118 are threaded through the apertures 113, 114 of the bracket 111 and the terminals of these conductor means are secured to the contacts 131, 132 by soft solder. As mentioned above, the conductor means 117, 118 are bent through at least 90° subsequent to threading through the apertures 113, 114 to thus reduce the likelihood of excessive tensioning. The conductor means 117, 118 are properly connected with the winding 149 without being subjected to any appreciable mechanical stresses, and the just described steps of assembling the tachometer generator 101 can be completed within short intervals of time by resorting to relatively simple machinery.

In accordance with a modified method of assembling the tachometer generator 101, the wire is convoluted around the frame 125 and the thus obtained winding 149 is placed with the frame 125 between the sections 105, 106 which are thereupon connected to each other by rivets 108 or analogous fasteners. Even though it is to be subjected to a treatment at elevated temperatures, the frame 125 may consist of relatively inexpensive synthetic plastic material with a wall thickness which is only a fraction of one millimeter and can have a high copper content. This is due to the fact that the heat treatment takes place while the frame 125 is already confined between the claw poles 102, 103 of the fully assembled sections 105, 106.

Upon completion of connection of the sections 105, 106 to each other, the ends of the wire forming the winding 149 are soldered to the respective contacts 131, 132 simultaneously with soldering of terminals of the conductor means 117, 118 to the contacts 131, 132. In the next step, the winding 149 (whose wire is coated with a suitable lacquer in a manner well known from the art) is baked with current impulses, for example, for a period of 30 seconds with 2 ampere current. The claw poles 102, 103 act not unlike a corset or cage which properly confines the frame 125 during baking even if the latter consists of low-quality synthetic plastic material and the thickness of its walls 126 is extremely low. The claw poles 102, 103 thereby prevent excessive deformation of the frame 125. Such heat-treatment of the winding 149 renders it possible to dispense with complex and expensive heat treating apparatus which are presently used for baking of windings for use in tachometer generators. Also, when a winding is to be baked in accordance with presently known techniques, its frame must exhibit a very high stability at the baking temperature which automatically eliminates a host of relatively inexpensive plastic materials from use in the making of frames for such windings. Also, the thickness of walls of frames which are to support windings during conventional baking must greatly exceed the thickness of the frame 125 so that the conventional frames are bulkier, heavier and more expensive. In fact, the baking of the winding 149 can take place after the tachometer generator 101 is mounted in or otherwise assembled with an electric motor, for example, with a fan motor.

Referring finally to FIG. 19, there is shown the tachometer generator 101 which includes the structure shown in FIGS. 7 to 18 and is built into a motor 148 for an electric fan. The conductor means 146, 147 for the motor 148 extend through the passage 145 defined in part by the section 106 (in the region of the notch 115) and in part by the bent-over bracket 111 for the conductor means 117, 118. The conductor means 146, 147 thereupon extend in parallelism with the conductor means 117, 118. This contributes to compactness of the electric motor.

The rotor of the tachometer generator 101 can be constructed in a manner as shown in FIG. 3. Thus, the air gap between the stator and the rotor can have a width of 1 millimeter or more which simplifies the production by allowing for greater tolerances in the making of discrete parts. Also, such relatively wide air gap allows for convenient mounting of the multiple magnet ring 45 of the rotor. In presently known tachometer generators, the width of the air gap is usually 0.3–0.5 millimeters which presents serious assembly problems in connection with insertion of the ring 45 into the annular member 48 of the rotor. Slight unbalance of the assembled rotor is of no consequence because the mass of its parts is minimal.

The control system of FIG. 6 exhibits the advantage that the shape of signal furnished by the tachometer generator does not affect the timing of energization or deenergization of the motor relay 58'. Thus, even though the form of signal which the tachometer generator supplies by way of the lead 55 is affected by the width of the air gap between the stator and the rotor and by eventual inaccuracies in mounting of the ring 45 in the annular member 48 (the ring 45 is normally secured by an adhesive), the evaluating circuit 75 can compensate for deviations of the signal from a desirable signal without affecting the accuracy and reliability of the control system. In assembling the tachometer generator 101 for use in place of the tachometer generator 54 in FIG. 6, the ring 45 is inserted into and adhesively secured to the annular member 48 and the prefabricated stator including the sections 105, 106, frame 125 and winding 149 is thereupon installed within the confines of the rotor. This presents no problems due to the aforediscussed substantial width of the air gap. The rectifier 72 of FIG. 6 furnishes to the evaluating circuit an auxiliary d-c voltage which, as explained above, can be about 10 V.

It will be noted that the control system of FIG. 6 dispenses with the amplifier 56 of FIG. 5, i.e., that the outlay for electronic parts is lower than in heretofore known control systems. The system of FIG. 6 is particularly suited for controlling a fan motor whose rotational speed can fluctuate within a rather wide range.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a tachometer generator, particularly for controlling the motor of an electric fan, a combination comprising a rotor mounted for rotation about a predetermined axis; and a claw-pole stator comprised of two discrete stator sections consisting of ferromagnetic material and substantially mirror symmetrical to each other with reference to a plane located between said sections, each stator section being comprised of a substantially disk-shaped central portion oriented normal to said axis, and each stator section being furthermore comprised of stator claw poles integral with the respective central portion and extending in direction parallel to said axis, said two stator sections being arranged adjacent each other in direction parallel to said axis with the claw poles of said two stator sections being interdigitated and defining an annular cage, and said stator sections being angularly offset relative to each other by a distance corresponding to half the distance between the centers of neighboring claw poles of a stator section, and said claw-pole stator further including a stator winding wound in said annular cage, wherein each of said disk-shaped portions is provided with a plurality of pairs of holes having their centers located at a predetermined distance from the axis of the respective section, one hole of each pair of holes in one of said disk-shaped portions being in register with the other hole of a pair of holes in the other disk-shaped portion, said stator further comprising fastener means extending through the registering holes of said disk-shaped portions to secure said sections to each other.

2. A combination as defined in claim 1, wherein each of said claw poles has a substantially rectangular outline as considered in the axial direction of said sections.

3. A combination as defined in claim 2, wherein said claw poles are stamped metallic strips and the neighboring claw poles of said sections are separated from each other by clearances of predetermined width as considered in the circumferential direction of said sections.

4. A combination as defined in claim 1, wherein said holes are closely adjacent to the respective annuli of claw poles and each of said disk-shaped portions is provided with three equidistant pairs of holes, one of said disk-shaped portions further comprising an integral bracket located diametrically opposite one pair of holes in said one disk-shaped portion.

5. A combination as defined in claim 1, wherein said stator further comprises a substantially spool-shaped thin-walled synthetic plastic frame for said winding, and wherein said frame has a substantially U-shaped cross-sectional outline and a wall thickness of about 0.5 millimeters.

6. In a tachometer generator, particularly for controlling the motor of an electric fan, a combination comprising a rotor mounted for rotation about a predetermined axis; and a claw-pole stator comprised of two discrete stator sections consisting of ferromagnetic material and substantially mirror symmetrical to each other with reference to a plane located between said sections, each stator section being comprised of a substantially disk-shaped central portion oriented normal to said axis, and each stator section being furthermore comprised of stator claw poles integral with the respective central portion and extending in direction parallel to said axis, said two stator sections being arranged adjacent each other in direction parallel to said axis with the claw poles of said two stator sections being interdigitated and defining an annular cage, and said stator sections being angularly offset relative to each other by a distance corresponding to half the distance between the centers of neighboring claw poles of a stator section, and said claw-pole stator further including a stator winding wound in said annular cage, wherein one of said disk-shaped portions comprises a bracket having a plurality of apertures for electrical conductor means connected to said winding, and wherein said bracket constitutes an integral part of said one disk-shaped portion and is bent at an oblique angle relative to the general plane of the respective section.

7. In a tachometer generator, particularly for controlling the motor of an electric fan, a combination comprising a rotor mounted for rotation about a predetermined axis; and a claw-pole stator comprised of two discrete stator sections consisting of ferromagnetic material and substantially mirror symmetrical to each other with reference to a plane located between said sections, each stator section being comprised of a substantially disk-shaped central portion oriented normal to said axis, and each stator section being furthermore comprised of stator claw poles integral with the respective central portion and extending in direction parallel to said axis, said two stator sections being arranged adjacent each other in direction parallel to said axis with the claw poles of said two stator sections being interdigitated and defining an annular cage, and said stator sections being angularly offset relative to each other by a distance corresponding to half the distance between the centers of neighboring claw poles of a stator section, and said claw-pole stator further including a stator winding wound in said annular cage, wherein said stator further comprises a substantially spool-shaped thin-walled synthetic plastic frame for said winding, wherein said frame is provided with integral sockets each having a channel including a narrower and a wider portion, said stator further comprising current-conducting contacts having first portions inserted into said channels and second portions connected with said winding.

8. A combination as defined in claim 7, wherein said frame is provided with slots adjacent to said sockets.

9. In a tachometer generator, particularly for controlling the motor of an electric fan, a combination comprising a rotor mounted for rotation about a predetermined axis; and a claw-pole stator comprised of two discrete stator sections consisting of ferromagnetic material and substantially mirror symmetrical to each other with reference to a plane located between said sections, each stator section being comprised of a substantially disk-shaped central portion oriented normal to said axis, and each stator section being furthermore comprised of stator claw poles integral with the respective central portion and extending in direction parallel to said axis, said two stator sections being arranged adjacent each other in direction parallel to said axis with the claw poles of said two stator sections being interdigitated and defining an annular cage, and said stator sections being angularly offset relative to each other by a distance corresponding to half the distance between the centers of neighboring claw poles of a stator section, and said claw-pole stator further including a stator winding wound in said annular cage, wherein each of said disk-shaped portions is provided with a plurality of pairs of holes having their centers located at a predetermined distance from the axis of the respective section, one hole of each pair of holes in one of said disk-shaped portions being in register with the other hole of a pair of holes in the other disk-shaped portion, wherein said pairs of holes each consist of two holes having centers circumferentially spaced from each other by an angular distance equal to one half the angular distance between adjoining claw poles of the respective stator section, said stator further comprising fastener means extending through the registering holes of said disk-shaped portions to secure said sections to each other.

10. A combination as defined in claim 9, wherein each of said pairs of holes is located near the periphery of the central portion of the respective stator section, and wherein each of said two stator sections is provided with three pairs of such holes, the pairs being circumferentially spaced from each other by equal angles.

11. In a tachometer generator, particularly for controlling the motor of an electric fan, a combination comprising a rotor mounted for rotation about a predetermined axis; and a claw-pole stator comprised of two discrete stator sections consisting of ferromagnetic material and substantially mirror symmetrical to each other with reference to a plane located between said sections, each stator section being comprised of a substantially disk-shaped central portion oriented normal to said axis, and each stator section being furthermore comprised of stator claw poles integral with the axis; and a claw-pole stator comprised of two discrete stator sections, each stator section being comprised of a substantially disk-shaped central portion oriented normal to said axis, and each stator section being furthermore comprised of stator claw poles integral with the respective central portion, each of said claw poles being comprised of a radially innermost first portion integral with the respective central portion and extending in direction parallel to said axis and away from the respective other one of said stator sections, each of said claw poles being further comprised of a second portion radially outwards of said first portion and integral with said first portion and extending radially outwards, and each of said claw poles being further comprised of a third portion integral with said second portion and extending in direction parallel to said axis and towards the respective other one of said stator sections, the claw poles of said two stator sections being interdigitated and defining an annular cage for a stator winding, with the disk-shaped central portions of said two stator sections being in surface-to-surface contact with and connected to each other, and said claw-pole stator further including a stator winding wound in said annular cage.

12. In a tachometer generator, particularly for controlling the motor of an electric fan, a combination comprising a rotor mounted for rotation about a predetermined respective central portion and extending in direction parallel to said axis, said two stator sections being arranged adjacent each other in direction parallel to said axis with the claw poles of said two stator sections being interdigitated and defining an annular cage, and said stator sections being angularly offset relative to each other by a distance corresponding to half the distance between the centers of neighboring claw poles of a stator section, and said claw-pole stator further including a stator winding wound in said annular cage, wherein said stator further comprises a substantially spool-shaped thin-walled synthetic plastic frame for said winding, and wherein said frame is provided with integral sockets each having a channel including a narrower and a wider portion, said stator further comprising current-conducting contacts having first portions inserted into said channels and second portions connected with said winding, and wherein said frame is provided with slots adjacent to said sockets, and wherein said frame comprises two sockets and two slots, the length of one of said slots exceeding the length of the other of said slots.

* * * * *